(12) United States Patent
Kim

(10) Patent No.: US 11,710,094 B2
(45) Date of Patent: Jul. 25, 2023

(54) DELIVERY METHOD FOR A TRAVELING VEHICLE USING A DRONE

(71) Applicants: HYUNDAI MOTOR COMPANY, Seoul (KR); KIA CORPORATION, Seoul (KR)

(72) Inventor: Kyoung Joo Kim, Daejeon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 59 days.

(21) Appl. No.: 17/411,251

(22) Filed: Aug. 25, 2021

(65) Prior Publication Data
US 2022/0180305 A1  Jun. 9, 2022

(30) Foreign Application Priority Data
Dec. 8, 2020 (KR) .................. 10-2020-0170490

(51) Int. Cl.
*G06Q 10/0832* (2023.01)
*G06Q 10/0835* (2023.01)
(Continued)

(52) U.S. Cl.
CPC ..... *G06Q 10/0832* (2013.01); *G06Q 10/0833* (2013.01); *G06Q 10/08355* (2013.01); *G06Q 50/30* (2013.01)

(58) Field of Classification Search
CPC ................................................... G06Q 50/30
(Continued)

(56) References Cited

U.S. PATENT DOCUMENTS 10,366,436 B1 * 7/2019 Kumar ................. G06Q 10/087
11,023,957 B1 * 6/2021 Montague ............ H04W 4/023
(Continued)

FOREIGN PATENT DOCUMENTS

| JP | 2022047408 A | * | 3/2022 | ......... G01C 21/3492 |
| KR | 101541359 B1 | | 8/2015 | |
| KR | 20190102131 A | | 9/2019 | |

OTHER PUBLICATIONS

Apparatus and Method for the Delivery of Food to Vehicles in Transit. Feb. 8, 2019. IP.com Prior Art Database. pp. 2-3. https://priorart.ip.com/IPCOM/000257391. (Year: 2019).*

*Primary Examiner* — Jeff Zimmerman
*Assistant Examiner* — Hunter A Molnar
(74) *Attorney, Agent, or Firm* — Lempia Summerfield Katz LLC

(57) ABSTRACT

A delivery method for a traveling vehicle using a drone includes: transmitting, by an orderer, first information including position information of a vehicle to a server and providing, by the server, a position and an inventory of service providers, which correspond to the first information including the position information of the vehicle, to the orderer; requesting, by the server, service provision to the service provider; transmitting, by the service provider, second information including article preparation information to the server; transmitting, by the server, third information including a plurality pieces of receipt position information, which corresponds to the first information including the position information of the vehicle and the second information including the article preparation information, to the orderer; transmitting, by the orderer, a value selected by receiving the third information including the plurality pieces of receipt position information to the server; transmitting, by the server, the selected value to a selected service provider; loading, by the selected service provider, an article of the (Continued)

orderer on a drone and instructing the drone to move to correspond to the third information including the plurality pieces of receipt position information; and receiving, by the orderer, the ordered article.

10 Claims, 3 Drawing Sheets

(51) Int. Cl.
*G06Q 10/0833* (2023.01)
*G06Q 50/30* (2012.01)

(58) Field of Classification Search
USPC .......................................................... 705/332
See application file for complete search history.

(56) References Cited

U.S. PATENT DOCUMENTS

| | | | | |
|---|---|---|---|---|
| 2002/0116202 | A1* | 8/2002 | Bantz | G06Q 10/0833 |
| | | | | 705/333 |
| 2016/0189101 | A1* | 6/2016 | Kantor | G08G 5/0013 |
| | | | | 705/338 |
| 2019/0043370 | A1* | 2/2019 | Mulhall | G01C 21/20 |
| 2019/0185157 | A1* | 6/2019 | Blake | B60L 53/67 |
| 2020/0265383 | A1* | 8/2020 | Zhang | G06Q 10/08355 |

\* cited by examiner

■ POSITION OF SERVICE PROVIDER  ○ AVAILABLE DELIVERY AREA OF DRONE
⊘ P1
◍ P2                                   ◉ P3

DELIVERY METHOD FOR A TRAVELING VEHICLE USING A DRONE

CROSS-REFERENCE TO RELATED APPLICATION

This application claims under 35 U.S.C. § 119(a) the benefit of priority to Korean Patent Application No. 10-2020-0170490 filed on Dec. 8, 2020, the entire contents of which are incorporated herein by reference.

BACKGROUND

(a) Technical Field

The present disclosure relates to a delivery method for a traveling vehicle using a drone. More particularly, it relates to a delivery method for a traveling vehicle using a drone, in which a service is capable of being provided through a drone by selecting a position where a vehicle is capable of being safely stopped on a movement path of an orderer. In addition, it relates to a delivery method for a traveling vehicle using a drone, in which a service is capable of being provided according to a changed position through communication between a service provider and a server even when the orderer changes a service receipt position within a predetermined range even after an order is completed.

(b) Background Art

Recently, unmanned aerial vehicles capable of flying and capturing images have been developed and supplied. Generally, unmanned aerial vehicles capable of flying and operating due to guidance of radio waves and having rotary wings are referred to as drones. Drones have recently been used to perform various functions in various fields such as high-altitude photography and delivery, and research on the drones are being actively carried out.

Meanwhile, generally, a product delivery service is provided among an orderer, a service provider, and a delivery provider. The delivery provider delivers articles between the orderer and the service provider. and the product delivery service is a service collectively referred to as one-to-one article exchange among the orderer, the service provider, and the delivery provider.

Recently, there is a growing interest in unmanned delivery systems using drones, and commercial services are also provided in some sites. Google plans to use driverless cars for delivery. Amazon is trying a service referred to as "Prime Air," which is a service for delivering an article to a front yard of a user using a robot within 30 minutes when the user orders the article over the Internet. In addition, Dominos, which is a global pizza delivery provider, has demonstrated a service to deliver a pizza using a robot. The above delivery services aim to improve customer satisfaction and delivery efficiency by delivering articles to users more quickly.

However, until now, drone delivery services are limited to delivering articles from a predetermined non-moved position to another position. In urban areas, since people frequently use vehicles to move around, in order to enjoy coffees, drinks, and foods in their vehicles, more and more people stop by drive-thru stores to order and receive such drinks and foods. To reduce the above inconvenience, there is a need for a service in which, when articles are ordered in traveling vehicles, service providers (coffee shops, restaurants, and the like) load the ordered articles on drones and deliver the ordered articles to the ordering vehicles. However, since the vehicle is not an object fixed at one position, there is a problem in that it is not possible to provide a smooth service using the existing drone delivery method so that a delivery service technology is required in consideration of characteristics of movable vehicles.

SUMMARY OF THE DISCLOSURE

The present disclosure has been made in an effort to solve the above-described problems associated with prior art.

In one aspect, the present disclosure provides a delivery method for a traveling vehicle using a drone. According to the delivery method, an orderer orders foods or articles using Audio, Video, Navigation (AVN) in the vehicle or a smartphone on a movement path of a traveling vehicle, and the ordered foods or articles are directly safely delivered to a position where the vehicle is stopped and which is selected by the orderer.

In addition, the present disclosure provides a delivery method for a traveling vehicle using a drone in which a service is capable of being provided according to a changed position through communication between a service provider and a server even when the orderer changes a service receipt position within a predetermined range even after an order is completed.

Objectives of the present disclosure are not limited to the above-described objectives. Other objectives of the present disclosure, which are not mentioned herein, can be understood by the following description and also should be apparently understood through embodiments of the present disclosure. Further, the objectives of the present disclosure can be implemented by means described in the appended claims and a combination thereof.

A delivery method fora traveling vehicle using a drone for achieving the above objective of the present disclosure includes the following operations.

In an embodiment, the present disclosure provides a delivery method for a traveling vehicle using a drone. The method includes transmitting, by an orderer, first information including position information of a vehicle to a server and providing, by the server, a position and an inventory of service providers, which correspond to the first information including the position information of the vehicle, to the orderer. The method further includes requesting, by the server, service provision to the service provider; transmitting, by the service provider, second information including article preparation information to the server. The method further includes transmitting, by the server, third information including a plurality pieces of receipt position information, which corresponds to the first information including the position information of the vehicle and the second information including the article preparation information, to the orderer. The method further includes transmitting, by the orderer, a value selected by receiving the third information including the plurality pieces of receipt position information to the server. The method further includes transmitting, by the server, the selected value to a selected service provider. The method further includes loading, by the selected service provider, an article of the orderer on a drone and instructing the drone to move to correspond to the third information including the plurality pieces of receipt position information. The method further includes receiving, by the orderer, the ordered article.

In addition, the first information including the position information of the vehicle may be a current vehicle position and a movement path of the orderer. The second information including the article preparation information may be a calculated value of an estimated arrival time at a position corresponding to the first information including the position information of the vehicle, which is generated in response to an article preparation time input value of the selected service provider. The third information including the plurality pieces of receipt position information may be an inventory of positions corresponding to the first information including the position information of the vehicle and an article receiptable or delivery time displayed in the order of rapidity in time series, i.e., in the order of fastest or earliest delivery to the slowest or latest delivery time according to the inventory of positions, the available service providers, or both.

In addition, in the transmitting, by the orderer, of the first information including position information of a vehicle to the server and providing, by the server, positions and an inventory of service providers, which correspond to the first information including the position information of the vehicle, to the orderer, the orderer may select an allowable range, which is out of the movement path. The server may also expand or reduce a search range of the inventory of the service providers to correspond to the selected allowable range.

In addition, the server may measure a service distance in which a distance between a starting position of the drone and a position corresponding to the first information is less than or equal to ½ of an available traveling distance of the drone in consideration of performance of the drone or a weight of the article. The inventory of the service providers may be provided when the allowable range and the service distance match to each other.

In addition, in the transmitting, by the orderer, of the value selected by receiving the third information including the plurality pieces of receipt position information to the server, the orderer may select the value through a display of the vehicle or a terminal of the orderer.

In addition, the receiving, by the orderer, of the ordered article, may further include: determining whether the server receives a changed item of the first information including the position information of the vehicle; transmitting, by the server, the changed item of the first information including the position information of the vehicle to the drone; transmitting, by the orderer and the drone, current position information to the server; and completing, by the drone, delivery through mutual authentication with the orderer.

In addition, when the server does not receive the changed item of the first information including the position information of the vehicle, the delivery method may further include instructing the drone to move in response to the selected value of the third information including the plurality pieces of receipt position information, and include completing, by the drone, delivery through the mutual authentication with the orderer.

In addition, the determining of whether the server receives the changed item of the first information including the position information of the vehicle may further include, when the server receives the changed item of the first information including the position information of the vehicle, determining, by the server, whether the changed item of the received first information including the position information of the vehicle is within an available delivery range of the selected service provider.

In addition, the determining of whether the server receives the changed item of the first information including the position information of the vehicle may further include, when the changed item of the received first information including the position information of the vehicle by the server is out of the available delivery range of the selected service provider, requesting, by the server, the orderer to re-enter the changed item of first information including position information of the vehicle.

In addition, the mutual authentication between the drone and the orderer may be performed by communicating a first encryption key generated by the orderer and a second encryption key generated by the drone through the server.

In addition, the drone may be equipped with a global positioning system (GPS) and digital map information.

A delivery method for a traveling vehicle using a drone may include transmitting, by an orderer, first information including position information of a vehicle to a server and providing, by the server, a position which correspond to the first information including the position information of the vehicle and an inventory of service providers in which an allowable range and a service distance mutually match, to the orderer. The method may further include requesting, by the server, service provision to the service provider. The method may further include transmitting, by the service provider, second information including article preparation information to the server. The method may further include transmitting, by the server, third information including a plurality pieces of receipt position information, which corresponds to the first information including the position information of the vehicle and the second information including the article preparation information, to the orderer. The method may further include transmitting, by the orderer, a value selected by receiving the third information including the plurality pieces of receipt position information to the server. The method may further include transmitting, by the server, the selected value to a selected service provider. The method may further include loading, by the selected service provider, an article of the orderer on a drone and instructing the drone to move to correspond to the third information including the plurality pieces of receipt position information. The method may further include receiving, by the orderer, the ordered article.

Other aspects and embodiments of the present disclosure are discussed herein.

It should be understood that the terms "vehicle" or "vehicular" or other similar terms as used herein include motor vehicles in general. Such motor vehicles can include: passenger automobiles including sports utility vehicles (SUV), buses, trucks, and various commercial vehicles; watercraft including a variety of boats and ships; aircraft; and the like. Such motor vehicles can also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, such as, for example, vehicles that are both gasoline-powered and electric-powered.

The above and other features of the present disclosure are discussed herein.

BRIEF DESCRIPTION OF THE DRAWINGS

The above and other features of the present disclosure are now described in detail with reference to certain embodiments thereof illustrated in the accompanying drawings, which are given hereinbelow by way of illustration only, and thus are not limitative of the present disclosure, and wherein.

Figure 1:
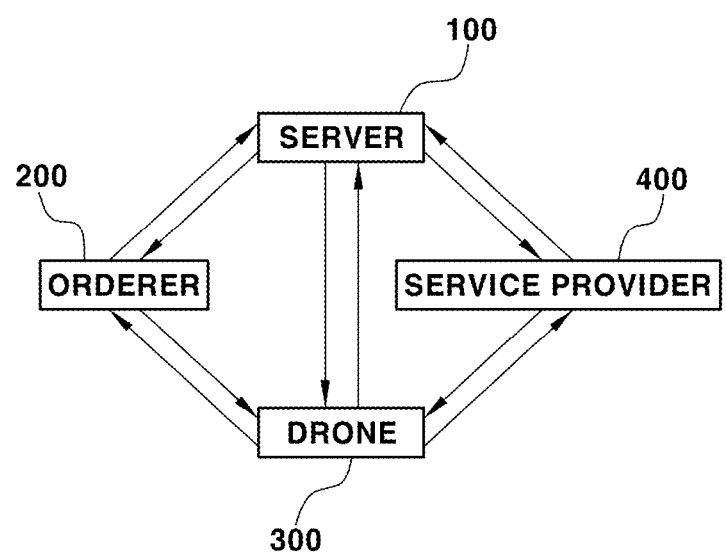
FIG. 1 is a diagram illustrating a communication relationship between components, which perform a delivery method for a traveling vehicle using a drone according to the present disclosure.

It should be understood that the appended drawings are not necessarily to scale, presenting a somewhat simplified representation of various features illustrating the basic principles of the present disclosure. The specific design features of the present disclosure as disclosed herein, including, for example, specific dimensions, orientations, locations, and shapes should be determined in part by the particular intended application and use environment.

In the figures, the same reference numbers refer to the same or equivalent parts of the present disclosure throughout the several figures of the drawing.

DETAILED DESCRIPTION

Hereinafter, embodiments of the present disclosure are described in detail with reference to the accompanying drawings. The embodiments of the present disclosure can be modified in various forms, and the scope of the present disclosure should not be construed as being limited to the following embodiments. These embodiments are provided to more fully describe the present disclosure to those having ordinary skill in the art.

In each of the steps, a reference numeral is used for convenience of description. This reference numeral does not describe the order of the steps. The steps may be differently performed from the described order unless clearly specified in the context. When a component, device, element, or the like of the present disclosure is described as having a purpose or performing an operation, function, or the like, the component, device, or element should be considered herein as being "configured to" meet that purpose or to perform that operation or function.

Figure 2:
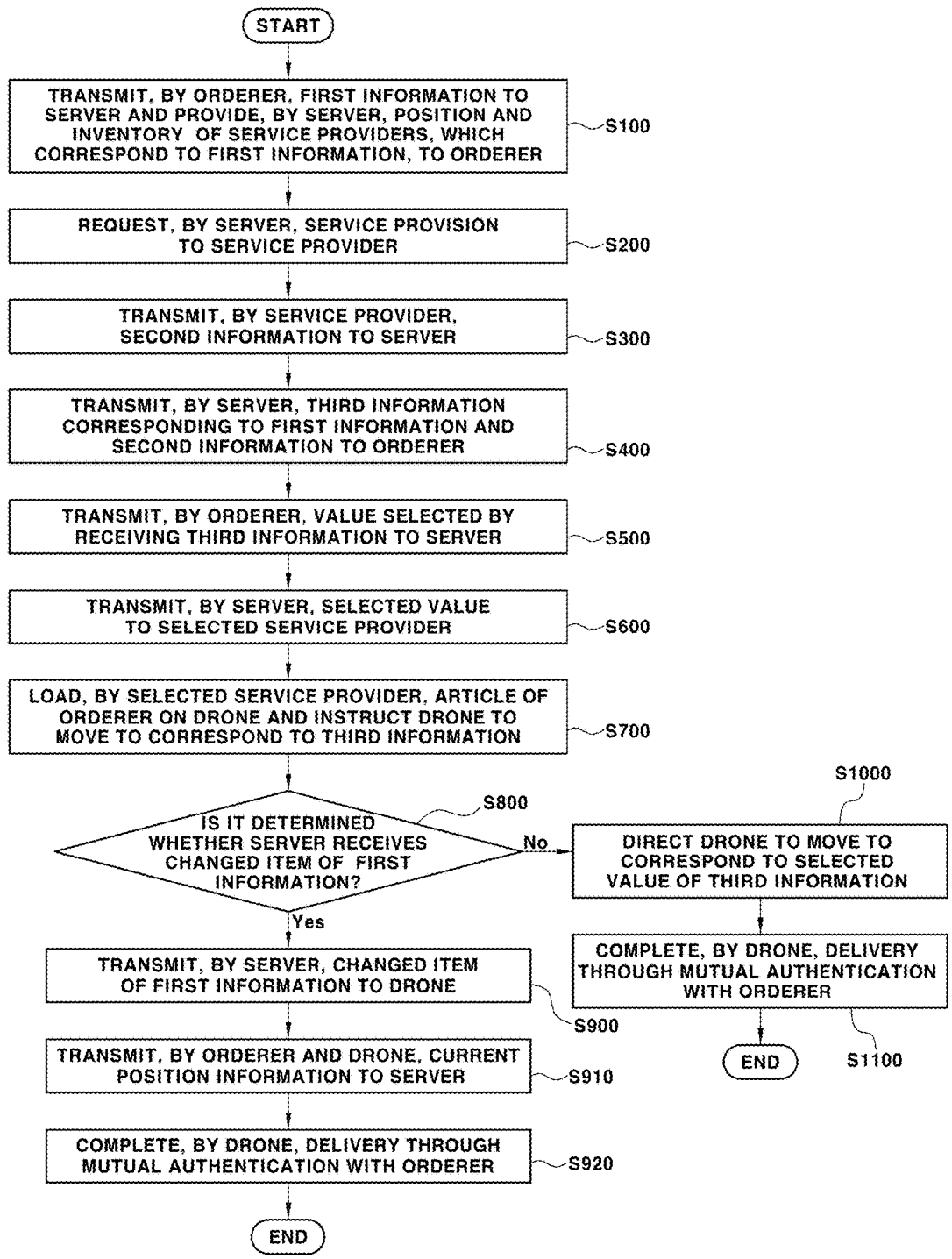
FIG. 2 is a flowchart illustrating a delivery method for a traveling vehicle using a drone according to one embodiment of the present disclosure.

The present disclosure relates to a delivery method for a traveling vehicle using a drone 300. FIG. 1 is a diagram illustrating a communication relationship between components, which perform the delivery method for a traveling vehicle using the drone 300 according to the present disclosure. FIG. 2 is a flowchart illustrating the delivery method for a traveling vehicle using the drone 300 according to one embodiment of the present disclosure.

Referring to FIGS. 1 and 2, a server 100 may comprehensively determine a current position and a movement path of a vehicle of an orderer 200 and future position information to provide a service, i.e., determine whether an article or food can be delivered and to set a position and a time for a service and may provide corresponding information to the orderer 200 and a service provider 400, respectively.

The vehicle of the orderer 200 may be a vehicle that includes an ordering system in which a communication function is installed and which is capable of ordering and making payment. An information input method of the orderer 200 may be a method of inputting information through a terminal such as a mobile phone or through an audio, video, or navigation (AVN) in the vehicle.

A service may be a concept, which includes all articles capable of being delivered, such as beverages including coffees, foods, and industrial products. The service provider 400 may be a coffee shop, a delivery restaurant, a convenience store, or the like that may provide articles to be ordered by the orderer 200. The service provider 400 may be a plurality of service providers 400 corresponding to a current position and a movement path of the vehicle of the orderer 200.

A selected service provider 400 may be a single service provider 400, which is determined after the orderer 200 receives information provided from the server 100 and inputs a selected value. The selected service provider 400 may be a service provider 400, which loads an ordered article on the drone 300 to provide a delivery service.

The drone 300 may be a small-sized unmanned aerial vehicle such as a multi-copter including a plurality of propellers. The phrase "unmanned aerial vehicle" may mean various types of flight vehicles, which are capable of automatically taking off, flying, and landing so as to achieve a specific purpose without human involvement according to a programmed control method or a control signal transmitted remote from the vehicle. The multi-copter is advantageous for attitude control in the air when compared to other types of unmanned aerial vehicles and is capable of hovering in which a continuous air flight state is maintained at a specific position and at a specific altitude. A power system in the drone 300 may include at least one propeller and a driving part such as a motor for driving the propeller.

The drone 300 may perform communication with an external communication device. Here, the external communication device may include a vehicle paired with the drone 300 and another drone 300 as well as a wireless terminal such as a smartphone and a wireless communication base station. In addition, in the delivery method for a traveling vehicle using a drone according to one embodiment of the present disclosure, the drone 300 may be equipped with a global positioning system (GPS) and digital map information.

The communication may include at least one among wireless communication, wired communication, and short-range communication. The wireless communication may include wireless communication supporting various wireless communication methods such as wireless fidelity (Wi-Fi), wireless broadband (Wibro), global system for mobile communication (GSM), code division multiple access (CDMA), wideband CDMA (WCDMA), time division multiple access (TDMA), and long term evolution (LTE).

The short-range communication may include a variety of near-field communication which transmits and receives signals using a wireless communication network in a short distance, such as Bluetooth, infrared communication, radio frequency identification (RFID) communication, wireless local access network (WLAN) communication, near field communication (NFC) communication, and Zigbee communication. The wired communication may include a variety of wired communication such as controller area network (CAN), local area network (LAN), wide area network (WAN), and value added network (VAN) as well as a variety of cable communication such as a universal serial bus (USB), a high definition multimedia interface (HDMI), and digital visual interface (DVI).

The delivery method for a traveling vehicle using a drone according to one embodiment of the present disclosure may include a number of acts or actions. The delivery method may include transmitting, by the orderer 200, first information including position information of the vehicle to the server 100 and providing, by the server 100, a position and an inventory of the service providers 400, which correspond to the first information including the position information of the vehicle, to the orderer 200. The method may further include requesting, by the server 100, service provision to the service provider 400. The method may further include transmitting, by the service provider 400, second information including article preparation information to the server 100. The method may further include transmitting, by the server 100, third information including a plurality pieces of receipt position information, which corresponds to the first information including the position information of the vehicle and the second information including the article preparation information, to the orderer 200. The method may further include transmitting, by the orderer 200, a value selected by receiving the third information including the plurality pieces of receipt position information to the server 100. The method may further include transmitting, by the server 100, the selected value to a selected service provider 400. The method may further include loading, by the selected service provider 400, an article ordered by the orderer 200 on the drone 300 and instructing the drone 300 to move to correspond to the third information including the plurality pieces of receipt position information. The method may further include receiving, by the orderer 200, the ordered article.

Hereinafter, each operation of the delivery method for a traveling vehicle using a drone according to one embodiment of the present disclosure is described in detail.

In S100, the orderer 200 transmits the first information including the position information of the vehicle to the server 100 and the server 100 provides the position and the inventory of the service providers 400, which correspond to the first information including the position information of the vehicle, to the orderer 200. S100 may be an operation after the orderer 200 checks services provided through a terminal or an AVN of the vehicle and selects a necessary service.

The first information including the position information of the vehicle may be information on the current position of the vehicle of the orderer 200 and a path on which the vehicle is to move in the future. After the orderer 200 selects a service to be ordered in the vehicle, the orderer 200 may transmit the first information including position information of the vehicle to the server 100. In this case, the server 100 may provide the position and the inventory of the service providers 400, which correspond to the first information including the position information of the vehicle, to the orderer 200.

When the movement path of the vehicle of the orderer 200 is set, the position and the inventory of the service providers 400, which correspond to the first information including the position information of the vehicle, may be derived by searching for a parking and stopping available position P1 on or around the movement path by the server 100. When the movement path of the vehicle of the orderer 200 is not set, the server 100 may search and derive the parking and stopping available position P1 based on the current position of the vehicle of the orderer 200. The server 100 may transmit information to display the position and the inventory of the service providers 400, which correspond to the first information including the position information of the vehicle, on a display such as a navigation or a terminal of the orderer 200.

The server 100 may search for the parking and stopping available position P1 by finding the movement path of the vehicle of the orderer 200 or for a position where parking is available around the current position of the vehicle or considering stopping available time data.

The service provider 400 may be selected in consideration of an available travel distance of the drone 300, which may be operated by the service provider 400 on or around the movement path of the vehicle of the orderer 200. Only when a distance between the service provider 400 and the above found parking and stopping available position P1 is ½ the distance or less than the available travel distance of the drone 300, which may be operated by the service provider 400, the service provider 400 may be displayed on the inventory.

An available delivery range of the service provider 400 may be increased or decreased according to a status of the drone 300 owned by a corresponding service provider 400. Only when the movement path of the ordering vehicle is within the available delivery range of the drone 300, the service provider 400 may be displayed on the inventory.

An available delivery area of the drone 300 owned by the service provider 400 may be varied according to a weight of an article being delivered. Even when the delivery fails, the available delivery area may be set to safely return to the service provider 400. In other words, when the delivery fails, the available delivery area of the drone 300 may be set in consideration of energy required to return back and a battery status of the drone 300 in a state in which the article to be delivered is still loaded.

As an example, the inventory of the service providers 400 may be provided when an allowable range and a service distance match each other. The allowable range may mean a range which may be out of the movement path in the first information. The service distance may mean an available delivery distance of the drone 300. In an embodiment, the service distance may be a distance value when a distance between a starting position of the drone 300 and the parking and stopping available position P1 is less than or equal to ½ of the available travel distance of the drone 300. When the article is not delivered to the orderer 200, the service distance may be calculated in consideration of the drone 300 returning back to the service provider 400. The service distance may be varied according to performance of the drone 300 owned by the service provider 400 or a weight of a service article. For example, when the performance of the drone 300 is good or the weight of the article is low, the service distance may be increased. The performance of the drone 300 may be determined in consideration of an amount of charging of a battery, an available travel distance according to the amount of charging of the battery, and a traveling speed.

Meanwhile, according to the delivery method for a traveling vehicle using a drone according to one embodiment of the present disclosure, in the transmitting, by the orderer 200, of the first information including the position information of the vehicle to the server 100 and providing, by the server 100, the position and the inventory of the service providers 400, which correspond to the first information including the position information of the vehicle, to the orderer 200, the orderer 200 may select an allowable range, which may be out of the movement path. The server 100 may also expand or reduce a search range of the inventory of the service providers 400 to correspond to the selected allowable range.

When the movement path of the vehicle of the orderer 200 is set, the server 100 may determine the parking and stopping available position P1 so as not to be out of a scheduled movement path as much as possible. In this case, the orderer 200 may be allowed to select an allowable range, which may be out of the scheduled movement path. Thus, when there is no service provider 400 preferred by the orderer 200 in the inventory of the service providers 400, which corresponds to the first information including the position information of the vehicle, a search range of the orderer 200 may be increased. In addition, the orderer 200 may reduce a range which may be out of the movement path.

In S200, the server 100 requests the service provision to the service provider 400. S200 may be an operation of requesting the service provision to a plurality of service providers 400 on the inventory of the service providers 400 corresponding to the first information including the position information of the vehicle. In an embodiment, the server 100 may request service provision to a service provider 400 capable of delivering an article ordered by the orderer 200 to a position corresponding to the first information including the position information of the vehicle.

In S300 the service provider 400 transmits the second information including the article preparation information to the server 100 (S300). In S300, the service provider 400 receiving the request of the service provision from the server 100 may calculate an estimated arrival time at the parking and stopping available position P1 in consideration of a time required for preparing an article and transmit the estimated arrival time to the server 100.

The second information including the article preparation information may be a calculated value of an estimated arrival time at a position corresponding to the first information including the position information of the vehicle, which is generated in response to an article preparation time input value of the selected service provider 400. In the estimated arrival time, the selected service provider 400 prepares the article ordered by orderer 200 and delivers the article using the drone 300, and then the article arrives at the parking and stopping available position P1. The estimated arrival time may be a value in which an estimated arrival time at the parking and stopping available position P1 is automatically calculated in consideration of a speed and an available travel distance of the drone 300 used by the selected service provider 400 when the selected service provider 400 enters a time required for preparing the article into the server 100.

In S400, the server 100 transmits the third information including the plurality pieces of receipt position information, which corresponds to the first information including the position information of the vehicle and the second information including the article preparation information, to the orderer 200. S400 may be an operation of displaying service available times for services to be provided by a plurality of service providers 400 at the parking and stopping available position P1 on the navigation or the like of the orderer 200. In an embodiment, the server 100 may provide an inventory of times at which the orderer 200 may receive the article at the parking and stopping available position P1 on the movement path of the orderer 200 and a corresponding position thereof.

The third information including the plurality pieces of receipt position information may be an inventory of positions corresponding to the first information including the position information of the vehicle and an article receiptable time, i.e., receipt time or expected receipt or delivery time, displayed in the order of rapidity in time series, i.e., in the order of fastest or earliest delivery to the slowest or latest delivery time according to the inventory of positions or according to the available service providers 400, or both. The server 100 may collect the first information including the position information of the vehicle input by the orderer 200 and the second information including the article preparation information generated in response to the value input by the service provider 400 to provide a plurality pieces of information on the times at which the article may be received at the parking and stopping available position P1.

In other words, the server 100 may provide information to the orderer 200 to allow the orderer 200 to select a service provider 400, which provides a desired parking and stopping available position P1 and a delivery time, among the service providers 400 capable of delivering the article to a plurality of corresponding positions. The third information including the plurality pieces of receipt position information may be displayed by sorting the inventory into a distance to the parking and stopping available position P1 on the movement path of the vehicle of the orderer 200 and a delivery completion time.

When the article receiptable time is displayed on the navigation or the like of the orderer 200, an estimated arrival time of the vehicle and an estimated arrival time of the drone 300 at the parking and stopping available position P1 may be displayed, respectively, to allow the orderer 200 to check how long to wait after stopping the vehicle.

The article receiptable time may be selected as the later time of the estimated time at which the vehicle arrives at the parking and stopping available position P1 and the estimated time in which the service provider 400 prepares and delivers the article using the drone 300 and then the drone 300 arrives at the parking and stopping available position P1. In an embodiment, when the estimated arrival time of the vehicle is 13:15 and the estimated arrival time of the drone 300 is 13:20, the article receiptable time may be set as 13:20.

In S500, the orderer 200 transmits the value selected by receiving the third information including the plurality pieces of receipt position information to the server 100. S500 may be performed by inputting, by the orderer 200, a select value through the terminal or a display of the navigation in the vehicle. Additionally, the server 100 may transmit information to the orderer 200 to display an available service position in the fastest time of the third information including the plurality pieces of receipt position information as a recommended list.

In S600, the server 100 transmits the selected value to the selected service provider 400. In S600, when the orderer 200 orders an article and pays therefor through the AVN or the terminal in the vehicle, the orderer 200 may transmit order details, a license plate number, the position of the vehicle, and information on the article receiptable time to the service provider 400 selected through the server 100.

In S700, the selected service provider 400 loads the article of the orderer 200 on the drone 300 and instructs the drone 300 to move to correspond to the third information including the plurality pieces of receipt position information. In S700, the selected service provider 400 may prepare the article according to a time, desired by the orderer 200, to receive the article and may load the article on the drone 300 to deliver the article. The drone 300 may communicate with the server 100 to move in response to the parking and stopping available position P1 and the article receiptable time, which are selected by the orderer 200, of the third information including the plurality pieces of receipt position information.

Thereafter, the server 100 may automatically perform to guide the directions to the parking and stopping available position P1 selected by the AVN or the terminal in the vehicle of the orderer 200. In addition, arrivable time information on the parking and stopping available position P1 is transmitted to the server 100 again through communication in the vehicle so that the selected service provider 400 may prepare the article in time to allow the drone 300 to arrive at an exact time.

In the delivery method for a traveling vehicle using a drone according to one embodiment of the present disclosure, the receiving of the article ordered by the orderer 200 may further include: determining, by the server 100, whether to receive a changed item of the first information including the position information of the vehicle; transmitting, by the server 100, the changed item of the first information including the position information of the vehicle to the drone 300; transmitting, by the orderer 200 and the drone 300, current position information to the server 100; and completing, by the drone 300, delivery through mutual authentication with the orderer 200. Consequently, even after the order is completed and the orderer 200 changes an article receipt position within a predetermined range, there is an effect in that the article may be provided according to the changed position through communication between the orderer 200 and the selected service provider 400 through the server 100.

After the order is completed, the orderer 200 may change the position where the article is received by selecting the position from an inventory of a plurality of changeable positions displayed on the display or the terminal of the vehicle. The inventory of the plurality of changeable positions may be an inventory in which the selected service provider 400 delivers the article to the changed position and displays times at which the orderer 200 may receive the article in the order of rapidity in time series.

Hereinafter, when the orderer 200 changes the originally designated parking and stopping available position P1, subsequent operations are described in detail.

In S800, whether the server 100 receives the changed item of the first information including the position information of the vehicle (S800) is determined. In S800, whether the changed item of the first information including the position information of the vehicle is input through the AVN or the terminal in the vehicle of the orderer 200 may be determined. When the server 100 receives the changed item of the first information including the position information of the vehicle, the transmitting, by the server 100, of the changed item of the first information including the position information of the vehicle to the drone 300 (S900) may be further included.

In an embodiment, a changed position P2 and an estimated arrivable time is notified to the selected service provider 400 to allow the drone 300 of the selected service provider 400 to deliver the article to the changed position P2. After a destination is changed from the parking and stopping available position P1 to the changed position P2, the AVN of the vehicle may automatically start to guide the directions to the changed position P2. Additionally, owing to the change of the destination from the parking and stopping available position P1 to the changed position P2, the server 100 may transmit information to the selected service provider 400 that the article receiptable time is changed to prevent an obstacle in service preparation.

The delivery method for a traveling vehicle using a drone according to one embodiment of the present disclosure may further include, when the server 100 does not receive the changed item of the first information including the position information of the vehicle, instructing the drone 300 to move to correspond to the selected value of the third information including the plurality pieces of receipt position information (S1000), and completing, by the drone 300, the delivery through mutual authentication with the orderer 200 (S1100).

The selected service provider 400 may check the article requested by the orderer 200, the parking and stopping available position P1 or the changed position P2 where the article is to be received, and the article receiptable time and prepare the article according to the article receiptable time in consideration of a time required for delivery through drone 300 to start delivery using the drone 300.

When an arrival time at which the vehicle of the orderer 200 arrives at the parking and stopping available position P1 or the changed position P2 is delayed due to various variables, the selected service provider 400 may delay the preparation of the article according to a changed article receiptable time or delay starting of the delivery using the drone 300. Consequently, it is possible to appropriately deliver an article of which product value is changed over time.

In consideration of the vehicle arriving at the already designated parking and stopping available position P1 earlier or later than the estimated time due to road conditions and the like, the server 100 updates information on the article receiptable time in real time so that the drone 300 may be allowed to arrive at the vehicle of the orderer 200 with a minimum time difference. Since a travel distance of the drone 300 is relatively shorter than the travel distance of the vehicle and variables on the movement path are small, a departure time of the drone 300 from the selected service provider 400 may be adjusted according to the arrival time of the vehicle.

When the vehicle of the orderer 200 does not follow the path guidance of the navigation, since the arrivable time at the parking and stopping available position P1 or the changed position P2 may be different, when the vehicle moves to a new path, the server 100 may recalculate the article receiptable time corresponding to the parking and stopping available position P1 or the changed position P2 and provide the information to the selected service provider 400 and the orderer 200.

When the position to which the ordered article is delivered and the article receiptable time are finally determined, the orderer 200 and the drone 300 may perform an operation of transmitting current position information to the server 100 (S910). Thereafter, the completing, by the drone 300, of the delivery through mutual authentication with the orderer 200 (S920) may be performed.

When the vehicle of the orderer 200 arrives at the parking and stopping available position P1 or the changed position P2 prior to the drone 300 and then the drone 300 arrives, the drone 300 recognizes the license plate number of the vehicle of the orderer 200 and checks whether the vehicle of the orderer 200 is correct. When mutual authentication between the vehicle of the orderer 200 and the drone 300 is completed, the drone 300 may provide the article ordered by the orderer 200.

When the vehicle of the orderer 200 arrives later than the arrival time of drone 300, the drone 300 may check the estimated arrival time of the vehicle of the orderer 200, and when the orderer 200 is scheduled to arrive within a waiting time preset in the server 100, the drone 300 may wait at the parking and stopping available position P1 or the changed position P2. When the vehicle of the orderer 200 arrives, the drone 300 may provide the article after mutual authentication.

When it is difficult for the vehicle of the orderer 200 to arrive within the waiting time preset in the server 100, the drone 300 may return to the selected service provider 400 and then start from the selected service provider 400 again according to a newly calculated article receiptable time.

The waiting time preset in the server 100 may be set in consideration of a current battery status of the drone 300 and a time in which a quality degradation problem does not occur even when the article to be provided, for example, refrigerated food, hot food, or the like, is loaded on the drone 300.

In an embodiment, in the case of delivering ice drinks in summer when an outdoor temperature is high, when the drone 300 arrives prior to the vehicle of the orderer 200 and waits, since the ice may melt and a product value may be decreased, the waiting time preset in server 100 may be set to a small or smaller value.

In the delivery method for a traveling vehicle using a drone according to one embodiment of the present disclosure, the mutual authentication between the drone 300 and the orderer 200 may be performed to receive a first encryption key generated by the orderer 200 and a second encryption key generated by the drone 300 through the server 100.

In an embodiment, the drone 300 identifies the vehicle of the orderer 200 through recognition of the license plate number at the position of the orderer 200. When the orderer 200 and the drone 300 mutually authenticate through the first encryption key and the second encryption key, the orderer 200 receives the ordered article from the drone 300 so that the delivery may be completed.

Figure 3:
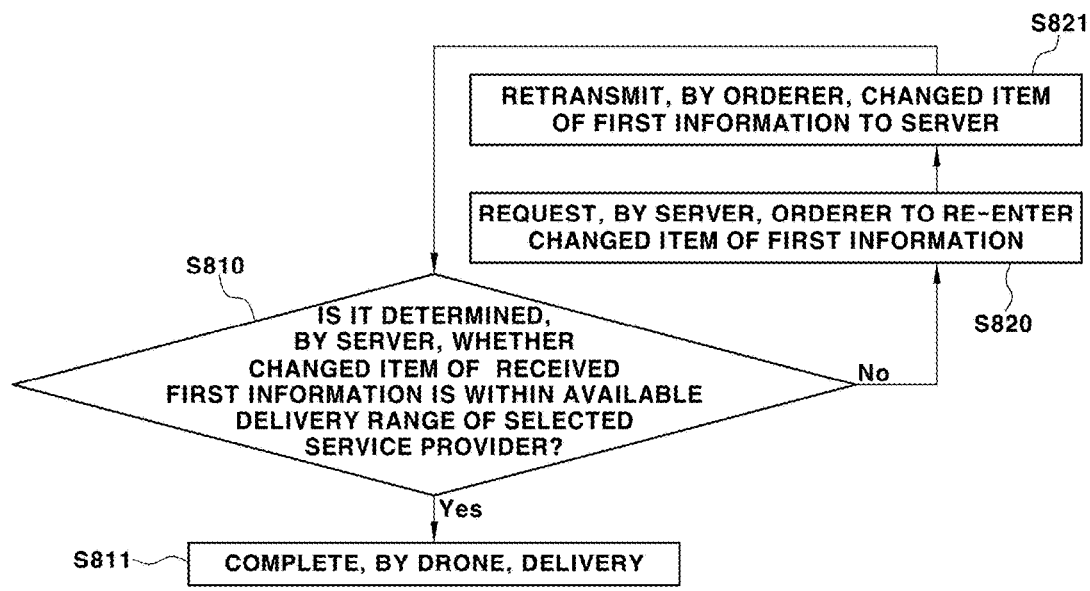
FIG. 3 is a flowchart illustrating the steps after a server performing the delivery method for a traveling vehicle using a drone receives a changed item of first information according to one embodiment of the present disclosure.
Figure 4:
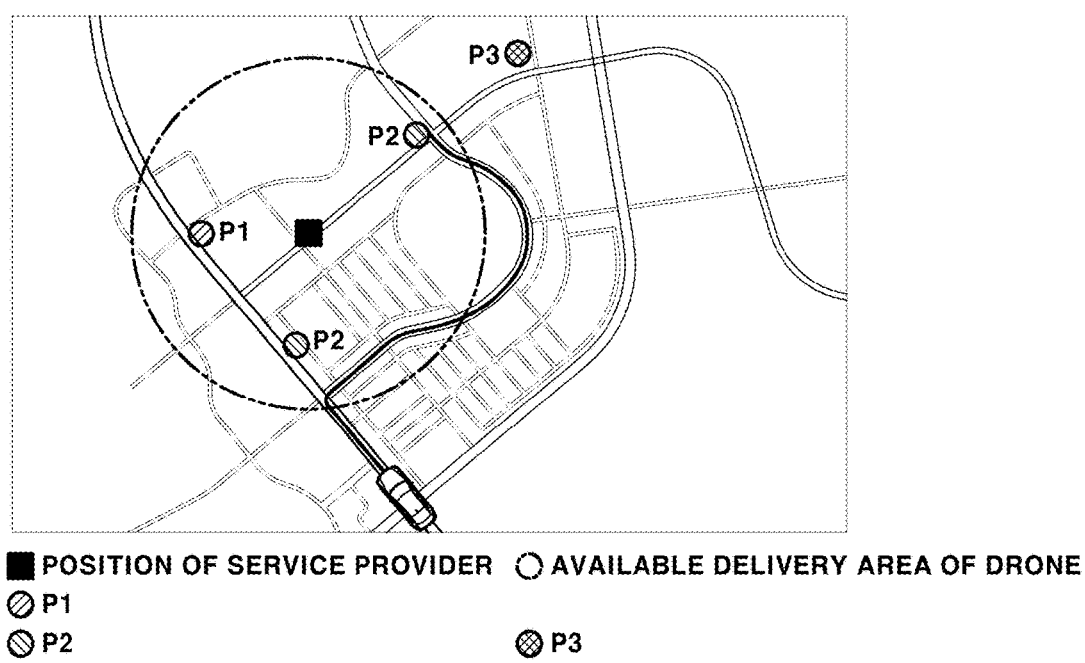
FIG. 4 is a diagram illustrating a criterion in which a server, which performs the delivery method for a traveling vehicle using a drone, determines whether the changed item of the first information is within an available delivery range of a selected service provider according to one embodiment of the present disclosure.

FIG. 3 is a flowchart illustrating after the server 100 performing the delivery method for a traveling vehicle using a drone receives a changed item of the first information including the position information of the vehicle according to one embodiment of the present disclosure. FIG. 4 is a diagram illustrating a criterion in which the server 100, which performs the delivery method for a traveling vehicle using a drone, determines whether the changed item of the first information including the position information of the vehicle is within a delivery range of the selected service provider 400 according to one embodiment of the present disclosure.

Referring to FIGS. 3 and 4, the delivery method for a traveling vehicle using a drone according to one embodiment of the present disclosure may further include, in the determining whether the server 100 receives the changed item of the first information including the position information of the vehicle (S800), when the server 100 receives the changed item of the first information including the position information of the vehicle, determining, by the server 100, whether the changed item of the first information including the received vehicle position information is within an available delivery range of the selected service provider 400 (S810). When the changed item of the first information including the position information of the vehicle received by the server 100 is out of the available delivery range of the selected service provider 400, an operation of requesting, by the server 100, a re-enter of the changed item of the first information including the position information of the vehicle to the orderer 200 (S820) may be further included.

An available delivery area of the drone 300 shown in FIG. 4 may be an available delivery area of the drone 300 of a service provider 400 selected from among the plurality of service providers 400.

The available delivery area of the drone 300 owned by the selected service provider 400 may be varied according to a weight of an article being delivered based on the position of the selected service provider 400. Even when the delivery fails, the available delivery area of the drone 300 may be set to safely return to the selected service provider 400. In other words, when the delivery fails, the available delivery area of the drone 300 of the selected service provider 400 may be set in consideration of energy required to return back and a battery status of the drone 300 in a state in which the article to be delivered is still loaded.

When the orderer 200 changes to a position P3 out of the available delivery area of the drone 300 of the selected service provider 400, the server 100 may request the orderer 200 to re-enter the changed item of the first information including the position information of the vehicle. In response to the re-entering, when the orderer 200 retransmits the changed item of the first information including the position information of the vehicle (S821), the server 100 may perform again the determining, by the server 100, of whether the changed item of the first information including the received vehicle position information is within the available delivery range of the selected service provider 400 (S810). When the changed item is within the available delivery range, the completing of the delivery may be performed through the drone 300.

In summary, according to the present disclosure, the delivery method for traveling vehicle using the drone 300 is provided. In the delivery method, a position where the vehicle may be safely stopped on the movement path of the orderer 200 may be selected and a service may be provided through the drone 300. Even after an order is completed and even when the orderer 200 changes a service receipt position within a predetermined range according to variables such as traffic conditions, the service may be provided according to the changed position through communication with the service provider 400 through the server 100.

The present disclosure can obtain the following effects according to a combination of the above-described embodiments and a configuration, which is described below, and a use relationship.

An orderer can order food or articles on a movement path of a traveling vehicle and receive a service provided to a position where the vehicle is safely stopped and has been selected by the orderer so that convenience of the orderer can be improved and a risk of unauthorized parking and stopping enforcement can be reduced.

In addition, even after the order is completed and even when the orderer changes the service receipt position within a predetermined range, the service can be provided according to the changed position through communication with the service provider through a server and flexible service can be provided according to traffic conditions.

The foregoing detailed description illustrates the present disclosure. Further, the foregoing is intended to illustrate and describe the specific embodiments of the present disclosure. The present disclosure may be used in various other combinations, modifications, and environments. In other words, it is possible to practice alternations or modifications without departing from the scope of the present disclosure as described in this specification, equivalents, and/or within the technical or knowledge scope in the art to which the present disclosure pertains. The described embodiments are intended to illustrate the best mode for carrying out the technical spirit of the present disclosure and various modifications can be made in the specific applications and uses of the present disclosure. Therefore, the detailed description is not intended to limit the present disclosure as in the disclosed embodiments. Further, it should be construed that the appended claims are intended to include other embodiments.

What is claimed is:

1. A delivery method for a traveling vehicle using a drone, comprising:

searching, by a server, for a parking and stopping available position based on a movement path of the traveling vehicle or a current vehicle position of the traveling vehicle;

transmitting, by an orderer, first information including position information of the traveling vehicle to the server and providing, by the server, a position and an inventory of service providers, which correspond to the first information including the position information of the traveling vehicle, to the orderer, wherein the position and the inventory of the service providers are derived from the parking and stopping available position;

requesting, by the server, service provision to the service providers;

transmitting, by the service providers, second information including article preparation information to the server;

transmitting, by the server, third information including a plurality of pieces of receipt position information, which corresponds to the first information including the position information of the traveling vehicle and the second information including the article preparation information, to the orderer;

transmitting, by the orderer, a value selected by receiving the third information including the plurality of pieces of receipt position information to the server;

transmitting, by the server, the selected value to a selected service provider of the service providers;

loading, by the selected service provider of the service providers, an article of the orderer on a drone and instructing and controlling the drone to move to the parking and stopping available position; and instructing and controlling, by the server, the traveling vehicle to travel to the parking and stopping available position to receive the article of the orderer, wherein, in the transmitting, by the orderer, of the first information including the position information of the traveling vehicle to the server and providing, by the server, the positions and the inventory of the service providers, which correspond to the first information including the position information of the traveling vehicle, to the orderer, the orderer selects an allowable range, within which the traveling vehicle is allowed to travel out of the movement path of the traveling vehicle, and the server expands or reduces a search range of the inventory of the service providers based on the selected allowable range, and wherein the server measures a service distance in which a distance between a starting position of the drone and the parking and stopping available position is less than or equal to ½ of an available traveling distance of the drone in consideration of performance of the drone or a weight of the article, and the inventory of the service providers is provided when the allowable range and the service distance match to each other.

2. The delivery method of claim 1, wherein:
the first information including the position information of the traveling vehicle is the current vehicle position and the movement path of the traveling vehicle;
the second information including the article preparation information is a calculated value of an estimated arrival time at a position corresponding to the first information including the position information of the traveling vehicle, which is generated in response to an article preparation time input value of the selected service provider of the service providers; and the third information including the plurality of pieces of receipt position information is an inventory of positions corresponding to the first information including the position information of the traveling vehicle and an article receiptable time displayed in an order of rapidity in time series.

3. The delivery method of claim 1, wherein, in the transmitting, by the orderer, of the value selected by receiving the third information including the plurality of pieces of receipt position information to the server, the orderer is capable of selecting the value through a display of the traveling vehicle or a terminal of the orderer.

4. The delivery method of claim 1, wherein the receiving, by the orderer, of the article of the orderer further includes:
determining whether the server receives a changed item of the first information including the position information of the traveling vehicle;
transmitting, by the server, the changed item of the first information including the position information of the traveling vehicle to the drone;
transmitting, by the orderer and the drone, current position information to the server; and
completing, by the drone, delivery through mutual authentication with the orderer.

5. The delivery method of claim 4, further comprising:
when the server does not receive the changed item of the first information including the position information of the traveling vehicle, instructing the drone to move in response to the selected value of the third information including the plurality of pieces of receipt position information; and completing, by the drone, delivery through the mutual authentication with the orderer.

6. The delivery method of claim 4, wherein, when the server receives the changed item of the first information including the position information of the traveling vehicle, the determining of whether the server receives the changed item of the first information including the position information of the traveling vehicle further includes determining, by the server, whether the changed item of the received first information including the position information of the traveling vehicle is within an available delivery range of the selected service provider of the service providers.

7. The delivery method of claim 6, wherein, when the changed item of the received first information including the position information of the traveling vehicle by the server is out of the available delivery range of the selected service provider of the service providers, the determining of whether the server receives the changed item of the first information including the position information of the traveling vehicle further includes requesting, by the server, the orderer to re-enter the changed item of first information including position information of the traveling vehicle.

8. The delivery method of claim 4, wherein the mutual authentication between the drone and the orderer is performed by communicating a first encryption key generated by the orderer and a second encryption key generated by the drone through the server.

9. The delivery method of claim 1, wherein the drone is equipped with a global positioning system (GPS) and digital map information.

10. A delivery method for a traveling vehicle using a drone, comprising:
searching, by a server, for a parking and stopping available position based on a movement path of the traveling vehicle or a current vehicle position of the traveling vehicle;

transmitting, by an orderer, first information including position information of the traveling vehicle to the server and providing, by the server, a position which correspond to the first information including the position information of the traveling vehicle, and an inventory of service providers when an allowable range and a service distance mutually match, to the orderer, wherein the position and the inventory of the service providers are derived from the parking and stopping available position;

requesting, by the server, service provision to the service providers;

transmitting, by the service providers, second information including article preparation information to the server;

transmitting, by the server, third information including a plurality of pieces of receipt position information, which corresponds to the first information including the position information of the traveling vehicle and the second information including the article preparation information, to the orderer;

transmitting, by the orderer, a value selected by receiving the third information including the plurality of pieces of receipt position information to the server;

transmitting, by the server, the selected value to a selected service provider of the service providers;

loading, by the selected service provider of the service providers, an article of the orderer on a drone and instructing the drone to move to the parking and stopping available position; and instructing, by the server, the traveling vehicle to travel to the parking and stopping available position to receive the article of the orderer, wherein, in the transmitting, by the orderer, of the first information including the position information of the traveling vehicle to the server and providing, by the server, the positions and the inventory of the service providers, which correspond to the first information including the position information of the traveling vehicle, to the orderer, the orderer selects the allowable range, within which the traveling vehicle is allowed to travel out of the movement path of the traveling vehicle, and the server expands or reduces a search range of the inventory of the service providers based on the selected allowable range, and wherein the server measures the service distance in which a distance between a starting position of the drone and the parking and stopping available position is less than or equal to ½ of an available traveling distance of the drone in consideration of performance of the drone or a weight of the article.

* * * * *